(No Model.)
E. BOULIER.
SPEED INDICATOR FOR BICYCLES.
No. 523,565. Patented July 24, 1894.
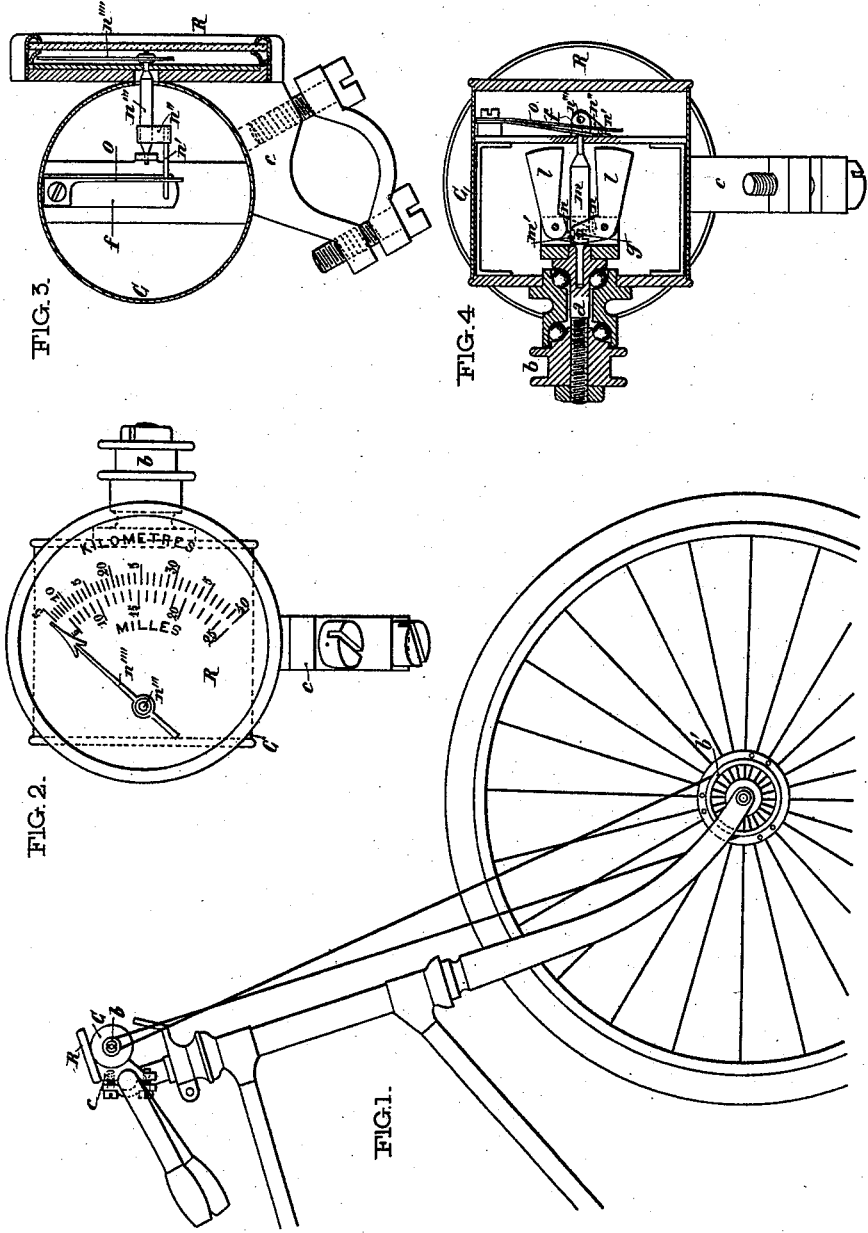

UNITED STATES PATENT OFFICE.

EUGÉNE BOULIER, OF LES LILAS, FRANCE.

SPEED-INDICATOR FOR BICYCLES.

SPECIFICATION forming part of Letters Patent No. 523,565, dated July 24, 1894.

Application filed May 10, 1893. Serial No. 473,701. (No model.) Patented in France December 8, 1892, No. 226,251; in Belgium February 17, 1893; in England February 17, 1893, No. 3,562; in Luxemburg April 27, 1893, No. 1,818; in Switzerland April 28, 1893, No. 6,708; in Italy May 13, 1893, No. 33,998/380, and in Austria-Hungary October 20, 1893, No. 24,254 and No. 39,901.

*To all whom it may concern:*

Be it known that I, EUGÉNE BOULIER, a citizen of the Republic of France, residing at Les Lilas, in the Republic of France, have invented certain new and useful Improvements in Speed-Indicators, (for which I have obtained Letters Patent in France, No. 226,251, dated December 8, 1892; in Belgium, dated February 17, 1893; in England, No. 3,562, dated February 17, 1893; in Austria-Hungary, No. 24,254 and No. 39,901, dated October 20, 1893; in Italy, No. 33,998/380, dated May 13, 1893; in Luxemburg, No. 1,818, dated April 27, 1893, and in Switzerland, No. 6,708, dated April 28, 1893,) of which the following is a specification.

The present invention is especially intended to be used in connection with velocipedes and comprises the adaptation of a speed-indicator to a velocipede which indicator is mounted on the handle-bar and worked by the movement of the machine.

Figure 1 shows the method of applying the invention to a bicycle. Fig. 2 is a view showing the exterior of the indicator and the indicator dial. Fig. 3 is a side view partly in section with the cover removed and showing the mechanism. Fig. 4 is a longitudinal sec-through the case and mechanism.

The indicator comprises a regulator provided with wings and the arbor $a$ of which passing through one of the covers of the circular case C containing the mechanism, is provided at its extremity outside the case with a pulley $b$ which is driven by a cord or string, passing over a pulley $b'$ of a larger diameter which latter is fixed in the present case on the hub of the front wheel of the bicycle; it is evident that any other suitable means of driving the indicator could be adopted. The other extremity of the arbor $a$ is made to receive a spindle $m$ provided with a groove or slot $m'$ in which enter pins $g$ on the knees $n$ of the wings $l$ pivoted in the arbor $a$ are enabled to open more or less under centrifugal action according to the speed of the machine.

In order to obtain a constant and automatic indication of the speed it is only necessary to communicate the angular movement of the wings $l$ through the spindle $m$ to a pointer moving over a dial which may be graduated for kilometers per hour or any other divisions indicating the distance for a pre-determined time such as is shown in Fig. 2.

In the example shown in the drawings the dial R is marked with some divisions indicating kilometers per hour and others indicating English miles per hour. For this purpose the said spindle $m$, which is submitted to the action of a spring $f$, the tension of which should be adjusted according to the centrifugal force developed by the wings $l$, acts on a little crank $n''$ which is fixed to the arbor $n'''$ of the pointer $n''''$ and a very weak spring $o$ acting against the pin $n'$ keeps the crank always in contact with the spring $f$. The axis of the pointer is fixed in the usual way on the spindle $m$. A clamp $c$ is provided to fix the apparatus on the handle-bar or in any other suitable place on the machine where it may be easily seen by the cyclist. It is obvious that by this means the cyclist, knowing the normal speed he desires to keep up, can at any moment ascertain whether he goes more or less wrong and thus regulate his speed accordingly.

I claim—

1. In a speed indicator, the combination with the driving spindle and bell crank arms weighted on the outer ends journaled thereon to swing transversely, of the longitudinally movable spindle cooperating with the inner ends of the bell crank arms and moved longitudinally thereby, an arm moved by the spindle in its longitudinal movement, a cranked spindle cooperating with the arm and carrying a pointer, whereby the extent of longitudinal movement of the spindle and consequent rate of speed is indicated; substantially as described.

2. In a speed indicator for bicycles and similar vehicles, the combination with the casing having the clamp for attachment to the vehicle, the spindle journaled in the casing and having the wheel on the outer end adapted to be connected by gearing to one of the ground wheels, the transversely swinging weighted bell crank arms carried by the inner end of the spindle, and the longitudinally movable spindle moved by said arms, of the crank shaft, the pointer carried thereby, the arm interposed between the crank and end of the longitudinally movable spindle, the spring for returning the crank to normal position and the external dial with which the pointer cooperates to indicate the rate of speed; substantially as described.

In testimony whereof I have hereunto set my hand in the presence of two subscribing witnesses.

EUGÉNE BOULIER.

Witnesses:
LLULLÉYE,
ROBT. M. HOOPER.